US007552384B2

(12) United States Patent
Marmigere et al.

(10) Patent No.: US 7,552,384 B2
(45) Date of Patent: Jun. 23, 2009

(54) SYSTEMS AND METHOD FOR OPTIMIZING TAG BASED PROTOCOL STREAM PARSING

(75) Inventors: Gerard Marmigere, Drap (FR); Joaquin Picon, St. Laurent du Var (FR); Zsolt Szalai, Tourettes sur Loup (FR)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 10/550,977

(22) PCT Filed: Feb. 13, 2004

(86) PCT No.: PCT/EP2004/002398

§ 371 (c)(1),
(2), (4) Date: Sep. 26, 2005

(87) PCT Pub. No.: WO2004/086248

PCT Pub. Date: Oct. 7, 2004

(65) Prior Publication Data

US 2006/0236222 A1 Oct. 19, 2006

(30) Foreign Application Priority Data

Mar. 27, 2003 (EP) ................................ 03368022

(51) Int. Cl.
*G06F 17/00* (2006.01)
(52) U.S. Cl. ...................... 715/234; 715/267; 715/276; 707/6; 707/101; 707/102
(58) Field of Classification Search ................ 715/205, 715/209, 234, 237, 242, 248, 276, 277, 267; 707/6, 101, 102
See application file for complete search history.

(56) References Cited

U.S. PATENT DOCUMENTS

| | | | | |
|---|---|---|---|---|
| 6,480,865 B1* | 11/2002 | Lee et al. | ...................... | 715/234 |
| 6,675,354 B1* | 1/2004 | Claussen et al. | ............ | 715/205 |
| 6,880,125 B2* | 4/2005 | Fry | ............................ | 715/234 |
| 6,964,014 B1* | 11/2005 | Parish | ........................ | 715/205 |
| 7,089,567 B2* | 8/2006 | Girardot et al. | ............. | 719/330 |
| 7,134,072 B1* | 11/2006 | Lovett et al. | ................. | 715/234 |
| 7,260,776 B2* | 8/2007 | Moreau et al. | ............... | 715/234 |
| 7,281,205 B2* | 10/2007 | Brook | ......................... | 715/237 |
| 2003/0237050 A1* | 12/2003 | Davidov et al. | ............. | 715/513 |
| 2006/0117307 A1* | 6/2006 | Averbuch et al. | ............ | 717/143 |

FOREIGN PATENT DOCUMENTS

FR 2826753 A1 1/2003

OTHER PUBLICATIONS

Hnich-Gasri, N., "Information Materials for IDS", Mar. 26, 2008, European Patent Office.

* cited by examiner

*Primary Examiner*—Doug Hutton
*Assistant Examiner*—James H Blackwell
(74) *Attorney, Agent, or Firm*—Norman Gundel; Hoffman Warnick LLC

(57) ABSTRACT

A method and system for optimizing tag based protocol streaming parsing. A method in accordance with an embodiment comprises: comparing a read tag and the tags of a reference tag table and, if the read tag belongs to the reference tag table, determining if a function name is associated with the tag belonging to the reference tag table, and if a function name is associated with the tag belonging to the reference tag table, executing the function corresponding to the tag corresponding to the reference tag table.

4 Claims, 2 Drawing Sheets

| | Tag | Attribute | Function |
|---|---|---|---|
| 110-1 | image | save, skip | SAVE_SKIP |
| 110-2 | image | save | SAVE |
| 110-3 | image | skip | SKIP |
| 110-4 | image | include | INCL |
| 110-5 | text | save, skip, style | S_S_S |
| 110-6 | text | save, skip | SAVE_SKIP |
| | ....... | ....... | ....... |
| 110-i | tag(i) | attribute(i) | function(i) |
| | ....... | ....... | ....... |
| 110-n | tag(n) | attribute(n) | function(n) |

SYSTEMS AND METHOD FOR OPTIMIZING TAG BASED PROTOCOL STREAM PARSING

COPYRIGHT NOTICE

A portion of the disclosure of this patent document contains material which is subject to copyright protection. The copyright owner has no objection to the facsimile reproduction by anyone of the patent disclosure, as it appears in the U.S. patent and Trademark Office patent file or records, but otherwise reserves all copyright rights whatsoever.

FIELD OF THE INVENTION

The present invention relates generally to the encoding and decoding of electronic documents and more specifically to systems and method for optimizing the parsing of tag based protocol streams.

BACKGROUND OF THE INVENTION

Recently, communications between computer systems for data and information exchange has been significantly developing thanks to the Internet, which is known to have rapidly widespread on a global level by virtue of being supported by public communication networks, both traditional and technologically advanced ones, such as the ISDN, the ADSL, the GPRS, and others.

Success of this phenomenon is indeed due, also, to the availability, in real time and cheaply, of information and data stored on servers located all over the globe and connected through dedicated digital lines to computers reachable through the various last mile network access services.

Most of the electronic texts available from the World Wide Web are formatted according to the Hyper Text Markup Language (HTML) standard. Unlike other electronic texts, HTML 'source' documents, from which content text is displayed, contain embedded textual tags. HTML is designed to display the data and to focus on how data looks. However, since HTML presents several drawbacks, in particular the inevitable pre-definition of tags, extensible Markup Language (XML) has been created by the World Wide Web Consortium (W3C). XML is designed to describe data and to focus on what data is. Like HTML, XML is based on Standard Generalized Markup Language (SGML). Although SGML has been used in the publishing industry for decades, its perceived complexity intimidates many people that otherwise might have used it.

Using XML, a meaning may be assigned to each tag of the document so that it is easy for a machine to process the information. For example, a postal code may be easily extracted from a document by simply locating the content surrounded by special tags that could be <postal-code> and </postal-code>, technically referred to as the <postal-code> element.

There are three common terms used to describe parts of an XML document, tags, elements, and attributes:
- a tag is a string of characters comprised between the left angle bracket '<' and the right angle bracket '>'. There are starting tags and ending tags, an ending tag corresponding to the starting tag wherein a '/' is inserted between the left angle bracket and the text.
- an element corresponds to the starting tag, the ending tag and everything in between.
- an attribute is a name and/or an associated value included inside a tag of an element.

For example, considering the following XML document,

```
<address>
    <name>
        <title>Mrs.</title>
        <first-name>
            Mary
        </first-name>
        <last-name>
            McGoon
        </last-name>
    </name>
    <street>
        1401 Main Street
    </street>
    <city state='NC'>AnyTown</city>
    <postal-code>
    34829
    </postal-code>
</address>
``` tags <name> and </name> represent a starting tag and an ending tag, respectively, the <name> element contains three child elements <title>, <first-name> and <last-name> and state is an attribute of the <city> element.

Since XML is designed to describe data, it simplifies data interchange and enables smart code wherein important information may be easily identified.

U.S. Pat. No. 6,480,865 describes a method for annoting XML documents with dynamic functionality. The dynamic functionality comprises invocations of Java objects. These annotations belong to a different name space, and thus a Dynamic XML-Java (DXMLJ) processor recognizes elements within the XML document that are tagged with DXMLJ prefix tags, processes each of these tags, and transforms the XML document accordingly.

For handling XML documents, software applications are generally using an XML parser that may be considered as an interface between the document and the software. In such case, the XML parser extracts data from the XML documents to build its internal tree representation so as to provide the software applications with the required data. A parser used with XML document is qualified as a Document Object Model (DOM) parser or Simple API for XML (SAX) parser.

DOM parser creates a DOM tree in memory for an XML document. A DOM parser is usually used to manipulate the document, traverse it back and forth. However, since the main drawback of DOM parser is to be memory consuming, it is reserved to handle small documents.

SAX parser is an event-based driven interface and invokes callback methods when a tag is encountered. It is mainly used when no structural modification is planned and can handle huge documents.

These parsers may be validating or non validating parser. A validating parser checks the XML file against the rule imposed by the Document Type Definition (DTD) while a non validating parser does not validate the XML file against a DTD. Both validating and non validating parsers check for the well formedness of the XML document. A DTD specifies constraints on the valid tags sequences that can be in the document.

Therefore, since the use of XML document type is increasing dramatically over the Internet, as are the occurrences of large data objects in the contents to be transmitted, there is a need for optimizing the parsing of such document so as to improve the processing time of software applications handing this electronic document format.

SUMMARY OF THE INVENTION

Thus, it is a broad object of the invention to remedy the shortcomings of the prior art as described here above.

It is another object of the invention to provide a method for optimizing tag based protocol parsers.

It is a further object of the invention to provide optimized tag based protocol parsing adapted for handling a reference tag table associating functions to tags.

It is still a further object of the invention to provide optimized tag based protocol parsing, executing functions in accordance to tags of a tag based protocol stream.

The accomplishment of these and other related objects is achieved by a method for optimizing tag based protocol stream parsing, using a reference tag table comprising at least one tag and a corresponding function name, said method comprising, each time a tag is read from said tag based protocol stream, the steps of:

comparing said read tag and the tags of said reference tag table and, if said read tag belongs to said reference tag table, determining if a function name is associated to said tag belonging to said reference tag table and, if a function name is associated to said tag belonging to said reference tag table, executing the function corresponding to said function name associated to said tag belonging to said reference tag table.

Further advantages of the present invention will become apparent to the ones skilled in the art upon examination of the drawings and detailed description. It is intended that any additional advantages be incorporated herein.

DETAILED DESCRIPTION OF THE PREFERRED EMBODIMENT

According to the invention a reference tag table is provided, containing attributes that can enhance tags of tag based protocols, with the purpose to optimize the parsing task. Such reference tag table is associated to the tag based protocol document or to another table associated to the tag based protocol document. For example, all the XML streams and documents comprise an indication of the Document Type Definition (DTD) location, including the name of the DTD e.g., name.dtd, so that the XML parser may validate the XML stream or document. Using this name and/or this location indication, the XML parser may also determine the reference tag table to be used i.e., the reference tag table associated to the DTD e.g., name.rtt. Naturally, to handle the reference tag table, the parser needs to implement the necessary logic to read the table, retrieve the possible attributes, and execute the corresponding function.

Figures 1, 3:
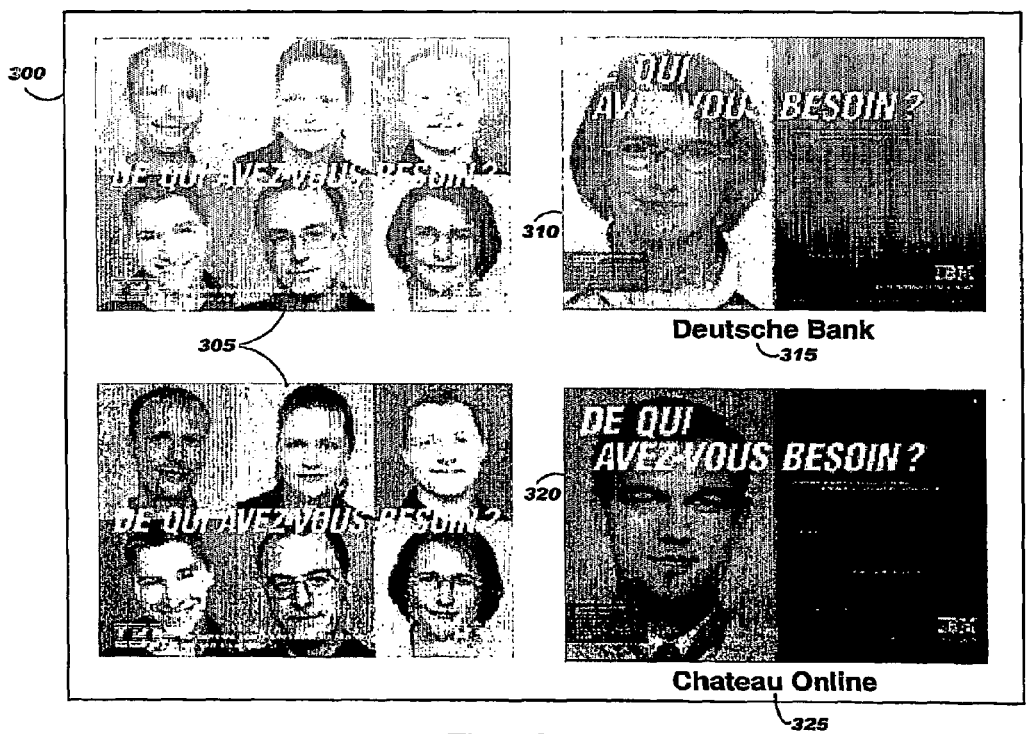
FIG. 1 depicts an example of a reference tag table illustrating the association of attribute and function names to a tag.
FIG. 3 shows an example of XML document content to illustrate the use of the invention.

FIG. 1 illustrates an example of a reference tag table 100. As Shown, reference tag table 100 comprises three columns 105-1 to 105-3 and n rows 110-1 to 110-n. The first column i.e., column 105-1, is used to store the name of the tags, the second column i.e., column 105-2, memorizes the attributes corresponding to the tag of column 105-1 and the last column i.e., column 105-3, memorizes the name of the function associated to the tag of column 105-1. For example, the tag image stored in column 105-1 and row 110-1 is associated to the attributes save and skip and to the function SAVE_SKIP, belonging to the same row 110-1, in columns 105-2 and 105-3, respectively.

According to the invention, each time the parser detects a tag, a lookup is done in the reference tag table. If the tag corresponds to one of the tag memorized in the reference tag table, the parser determines if one or several attributes are specified in the table for the tag being processed and extracts the name of the function associated to the tag. If there is no function associated to the tag, normal parsing continues. If there are one or several attributes associated to the tag, the parser determine the corresponding values from the document or stream. The attributes are passed as parameters to the function specified for the tag and the function is executed. If there is no attribute associated to the tag, the function is directly executed. If the tag does not correspond to one of the tag memorized in the reference tag table, normal parsing continues.

As shown on FIG. 1, a plurality of attributes may be assigned to a single tag. Depending upon the parser and the nature of the attributes, several cases could be encountered. If all the attributes of a tag are required to execute the associated function, the reference tag table comprises only one row for such tag. In such case, the function is executed only if, in the document or stream, a value is provided for each attribute of the tag. If some of the attributes of a tag are optional, it may be handled either by the reference tag table or by the parser itself. If it is handled by the reference tag table, the same tag is repeated in several rows, each row being dedicated to a particular attribute combination (there are as many rows as there are possible combinations). Else, if it is handled by the parser, a single row is dedicated to each tag and the parser analyzes the document or stream to extract the attribute values so as to determine the used optional attributes.

For sake of illustration, the system of the detailed description uses a reference tag table comprising, for each tag, as many rows as the number of possible combinations. Furthermore, in this detailed example, the table must be ordered in such a way that in the cases of multiple occurrences of the same tag in the table, the occurrences which carry the highest number of attributes come first in the table.

Figure 2:
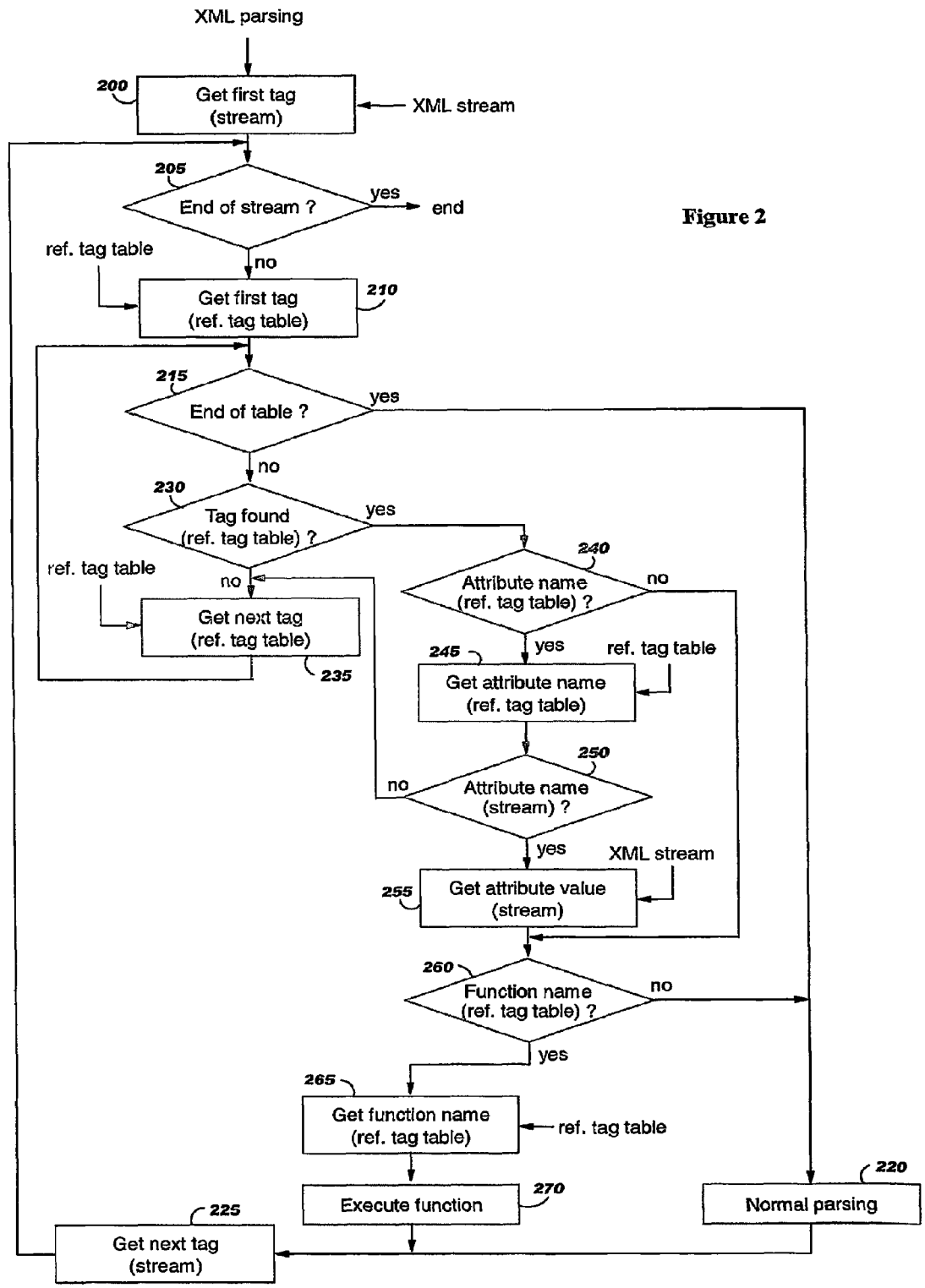
FIG. 2 illustrates schematically an example of an optimized XML parser algorithm according to the invention.

FIG. 2 illustrates schematically an example of the algorithm of the logic to be added to an XML parser, according to the invention. After having read the first tag from an XML stream (box 200), a test is done to determine whether or not the end of the stream has been reached (box 205). If the end of the stream is detected, the process stops. Else if the end of the stream is not detected, the first tag of the reference tag table associated to the DTD used for processing the XML stream i.e., the reference tag table associated to the XML document, is looked up (box 210) and a test is performed to determine whether or not the end of the reference tag table has been reached or not (box (215). If the end of the reference tag table has been reached, normal parsing continues (box 220), the next tag of the XML stream is looked up (box 225) and the process is repeated. Else if the end of the reference tag table has not been reached, another test is done to compare the selected tags of the reference tag table and of the XML stream (box 230). If the selected tags are different, the next tag of the reference tag table is read (box 235) and the process is branched to box 215 to determine whether or not the end of the reference tag table has been reached.

If the tag entry in the reference tag table matches the tag of the XML stream being processed, a new test is done to determine if there are attributes associated to the selected tag of the reference tag table (box 240). If there is at least one attribute associated to this tag, the XML parser gets the names of the attributes in the reference tag table (box 245) and in the XML stream to determine if they are the same (box 250). If the attribute names are the same, the XML parser gets the attribute values (box 255), else the process is branched to box 235 to select the next tag of the reference tag table. Then, the XML parser checks if there is a function name associated to the selected tag of the reference tag table (box 260). If there is no function name associated to this tag, normal parsing continues (box 220), the next tag of the XML stream is selected (box 225) and the process is repeated. Else if there is a function name associated to this tag, the XML parser gets the name of the function (box 265) and executes the function with the associated attribute values as parameters (box 270). Then, the next tag of the XML stream is selected (box 225) and the process is repeated.

If there is no attribute name associated to the selected tag of the reference tag table (box 240), the XML parser checks if there is a function name associated to the selected tag of the reference tag table (box 260). If there is no function name associated to this tag, normal parsing continues (box 220), the next tag of the XML stream is selected (box 225) and the process is repeated. Else if there is a function name associated to the selected tag of the reference tag table, the XML parser gets the name of the function (box 265) and executes the function without attribute value i.e., without any parameter (box 270). The next tag of the XML stream is then selected (box 225) and the process is repeated until the XML parser reaches the end of the XML stream.

To illustrate the parser of the invention let consider the following example of an XML document, the corresponding optimized XML document and the reference tag table that is associated to the corresponding DTD, consisting of the first four rows of the reference tag table illustrated on FIG. 1. The aim of this illustration is to show how an XML document may be optimized to reduce transmitting bandwidth and parsing processing time, and how the optimized XML parser handles it. The XML document (300) of the example consists in a first image (305) that is duplicated to be compared with two other images (310 and 320), each having a title (315 and 325, respectively), as illustrated on FIG. 3.

In this example without usage of this invention, the XML document would be:

```
<photo_compare>
    <first_compare>
        <image>
                ........... image_reference data ...........
        </image>
        <title>Deutsche Bank</title>
        <image>
                ........... image_1 data ...........
        <image>
    </first_compare>
    <second_compare>
        <image>
                ........... image_reference data ...........
        </image>
        <title>Chateau Online</title>
        <image>
                ........... image_2 data ...........
        </image>
    </second_compare>
</photo_compare>
``` and the corresponding XML document, optimized according To the invention, is:

```
<photo_compare>
    <first_compare>
        <image save=image_reference skip=1500>
                ........... image_reference data ...........
        </image>
        <title>Deutsche Bank</title>
        <image skip=1500>
                ........... image_1 data ...........
        </image>
    </first_compare>
    <second_compare>
        <image include=image_reference>
        </image>
        <title>Chateau Online</title>
        <image skip=1500>
                ........... image_2 data ...........
        </image>
    </second_compare>
</photo_compare>
```

In this example, the reference tag table associated to the DTD of the XML document comprises one particular tag, image, having three possible attributes, save, skip and include. Each of the allowed combinations determines one of the four functions, SAVE_SKIP, SAVE, SKIP and INCL, that may be interpreted by the XML parser, SAVE_SKIP function comprises two parameters, a name i.e., a string of characters, and a length, i.e. a number. SAVE_SKIP function stores the data that follows the tag in the memory in association with the label given as the name parameter and instructs the tag lookup function of the XML parser to skip over the long tag-free data object that follows, which results in decreased processing time. The amount of data to be skipped is the second parameter of the function and may be expressed e.g., as KBytes.

SAVE function has a name as parameter. SAVE function stores the data following the tag in the memory, in association with the label given as the parameter.

SKIP function allows the parser to skip the specified length of data to decrease processing time. The parameter of SKIP function is a data size e.g., a number of KBytes.

INCL function is used to insert data in the XML document representation. Its parameter is a name to which data is associated in the memory, the association being done with SAVE or SAVE_SKIP function.

These functions are given as examples and the invention is not limited to those.

Therefore, when the XML parser of the invention receives the optimized XML stream, it analyzes the tags according to the algorithm described above by reference to FIG. 2. After having looked up and read the first tag, photo_compare, of the XML stream (box 200 of FIG. 2), the XML parser checks that it is not the end of the stream (box 205) and gets the first tag of the reference tag table consisting in the first four rows of the table of FIG. 1, (box 210). Since this tag is not the last one of the reference tag table (box 215) and it does not match with the selected tag of the XML stream (box 230), the next tag of the reference tag table is looked up (box 235) and the process is repeated. Since the first tag photo_compare does not belong to the corresponding reference tag table, normal parsing continues (box 220) and the next tag of the XML stream is get (box 225). Likewise, normal parsing is performed on the first_compare tag. The next tag, image, is then read and identified for special parsing.

Again, the first tag of the reference tag table is selected (box 210) to be compared with the selected tag of the XML stream (box 230). Since the tags are the same and there are attributes (box 240), the XML parser gets the attribute names from the reference tag table (box 245) and checks the XML stream to compare attribute names of the reference tag table and of the XML stream (box 250). Since attribute names match, the XML parser gets the attribute values (box 255), checks the presence of an associated function (box 260) and gets its name (box 265). The associated function is SAVE_SKIP. Thus, during function execution (box 270), the XML parser memorizes the image that follows with the label reference, without analyzing the 1,500 KBytes of data, reference and 1,500 KBytes being the parameters of the function called by the tag image with the attributes save and skip. Then, the next tag of the XML stream is read and a normal processing continues until next tag image is found.

Once again, the first tag of the reference tag table is selected (box 210) to be compared with the tag being processed in the XML stream (box 230). Since the tags are the same and there are the attributes save and skip (box 240), the XML parser gets the attribute names from the reference tag table (box 245) and checks the XML stream to compare attribute names of the reference tag table and of the XML stream (box 250). Since attribute names do not match, the XML parser looks for the next tag in the reference tag table (box 235) and verifies that the end of the reference tag table has not been reached (box 215). Since the tags are the same (box 230) and there is the attribute save (box 240), the XML parser gets the attribute name from the reference tag table (box 245) and checks the XML stream to compare attribute names of the reference tag table and of the XML stream (box 250). Since attribute names do not match, the XML parser looks for the next tag in the reference tag table (box 235) and verifies that the end of the reference tag table has not been reached (box 215). The tags being the same (box 230) and being in presence of the attribute skip (box 240), the XML parser gets the attribute name from the reference tag table (box 245) and checks the XML stream to compare attribute names of the reference tag table and of the XML stream (box 250). Since attribute names match, the XML parser gets the attribute value from the XML stream (box 255), checks the presence of an associated function (box 260) and gets its name (box 265). The associated function is SKIP. Thus, during function execution (box 270), the XML parser does not analyze the following 1,500 KBytes of data i.e., the parser does not search any tag in this stream portion, 1,500 KBytes being the parameter of the function called by tag image with the attribute skip. Then, the next tag of the XML stream is read and normal processing continues until the next tag image (having include as attribute) is found. The process is repeated until the end of the stream.

At the end of the process, the optimized XML parser has built an internal tree representation of the optimized XML stream that may be used to provide data to a software application.

It is to be noticed that the size of the optimized XML stream is smaller than the one of the standard XML stream since redundant large data objects are not repeated. In the given example, the volume of data associated to large objects to be transmitted is reduced by twenty-five percent. Also, the parsing processing time is reduced since the parser's tag lookup function saves useless search for tags in the remaining three large objects, which are known to be tag-less anyway. Finally, it is to be noted that depending upon the functions associated to the tags in the reference tag table and the implementation of these functions, the optimized XML stream may be fully interpreted or not by a standard XML parser. For example, when considering SKIP_PARSING function, it allows to decrease the processing time when used within an optimized XML stream analyzed by a parser handling reference tag table. When the optimized XML stream is analyzed by a standard parser it does not change the resulting internal parser representation, the only difference lies in the processing time. However, when an optimized XML stream comprising functions like PASTE or IMPORT is analyzed by a standard parser, it leads to misinterpretation of the XML stream. In such case, the data is not re-inserted at its place, which results in an incomplete interpretation of the document on the parser end.

As described above, the reference tag table is preferably associated to the Document Type Definition (DTD) of the XML document. Therefore, the reference tag table may be transmitted with the associated DTD and the XML stream or may be stored by the XML parser. If the reference tag table is stored by the XML parser with the DTD, a dedicated tag of the XML stream allows the XML parser to establish the link between the XML stream and one of the stored DTD and reference tag table.

Naturally, in order to satisfy local and specific requirements, a person skilled in the art may apply to the solution described above many modifications and alterations all of which, however, are included within the scope of protection of the invention as defined by the following claims.

The invention claimed is:

1. A method for optimizing tag based protocol stream parsing, said method comprising:
   providing a reference tag table comprising a plurality of rows, each row comprising a first column containing a tag, a second column containing a set of one or more attributes corresponding to the tag in the first column, and a third column containing a name of a function associated with the tag in the first column, the function using a value of each of the attributes in the second column as a parameter when executed,
   each time a tag is read from the tag based protocol stream:
   comparing said read tag and the tags of said reference tag table and,
   if said read tag belongs to said reference tag table, determining if a function name is associated with said tag belonging to said reference tag table and,
   if a function name is associated to said tag belonging to said reference tag table, executing the function corresponding to said function name associated with said tag belonging to said reference tag table, wherein the function corresponding to a given tag is executed only if each attribute in the set of attributes associated with the read tag in the reference tag table is in the tag based protocol stream,
   wherein a same tag can be associated to a plurality of sets of different attributes in the reference tag table, and
   wherein a function corresponding to said function name associated to said tag belonging to said reference tag table comprises a skip function that allows a parser to automatically skip a determined amount of data following said read tag, the amount of data being either predetermined or being determined by an attribute value.

2. The method of claim 1 wherein a function corresponding to said function name associated to said tag belonging to said reference tag table comprises a save function that associates, in memory, a determined amount of data following said read tag to a predetermined label or to a label being given as an attribute value.

3. The method of claim 1 wherein said tag based protocol stream is an eXtensible Markup Language (XML) stream.

4. The method of claim 3 wherein said reference tag table is associated to a Document Type Definition defined in said XML stream.

* * * * *